United States Patent
Tollefson (10) Patent No.: US 8,749,393 B1
(45) Date of Patent: Jun. 10, 2014

(54) WATER LEAK DETECTION AND SHUT-OFF METHOD AND APPARATUS USING DIFFERENTIAL FLOW RATE SENSORS

(75) Inventor: Robin Tollefson, Irvine, CA (US)

(73) Assignee: Control Air Conditioning Corporation, Anaheim, CA (US)

( * ) Notice: Subject to any disclaimer, the term of this patent is extended or adjusted under 35 U.S.C. 154(b) by 617 days.

(21) Appl. No.: 12/931,869

(22) Filed: Feb. 14, 2011

(51) Int. Cl.
| | |
|---|---|
| *G01M 3/28* | (2006.01) |
| *G01M 3/32* | (2006.01) |
| *G01M 3/24* | (2006.01) |
| *F17D 5/02* | (2006.01) |
| *G08B 21/00* | (2006.01) |
| *F16K 17/00* | (2006.01) |
| *F16K 31/00* | (2006.01) |
| *G01M 3/04* | (2006.01) |
| *G01M 3/00* | (2006.01) |
| *A62C 37/50* | (2006.01) |

(52) U.S. Cl.
CPC .......... *G01M 3/2876* (2013.01); *G01M 3/2807* (2013.01); *G01M 3/3254* (2013.01); *G01M 3/243* (2013.01); *F17D 5/02* (2013.01); *A62C 37/50* (2013.01)
USPC ........... 340/605; 340/606; 340/611; 340/626; 137/460; 137/467; 137/486; 137/487; 73/40; 73/40.5 R (58) Field of Classification Search
CPC ............ G01M 3/2876; G01M 3/2807; G01M 3/3254; G01M 3/243; F17D 5/02; A62C 37/50
See application file for complete search history.

(56) References Cited

U.S. PATENT DOCUMENTS

| | | | | |
|---|---|---|---|---|
| 3,664,357 | A * | 5/1972 | Kreiss | 137/2 |
| 3,800,794 | A * | 4/1974 | Georgi | 604/507 |
| 4,066,095 | A * | 1/1978 | Massa | 137/486 |
| 6,663,349 | B1 * | 12/2003 | Discenzo et al. | 417/44.1 |
| 7,945,414 | B2 * | 5/2011 | Nagase et al. | 702/114 |
| 8,166,998 | B2 * | 5/2012 | Clappison | 137/460 |
| 2009/0165795 | A1 * | 7/2009 | Nadjafizadeh et al. | 128/204.18 |
| 2010/0012561 | A1 * | 1/2010 | Clappison | 210/133 |
| 2013/0174649 | A1 * | 7/2013 | Hains et al. | 73/40.5 R |

* cited by examiner

*Primary Examiner* — Julie Lieu
(74) *Attorney, Agent, or Firm* — William L. Chapin (57) ABSTRACT

A method and apparatus for detecting leakage of flowing liquids from pipes includes an upstream flow-rate sensor positioned between a source of a flowing liquid which is conducted from a source to a destination terminal such as a VAV heat exchanger, and a downstream flow-rate sensor positioned between an outlet port of the destination terminal and a return line for the flowing liquid. The apparatus includes electronic control circuitry which is responsive to a differential flow-rate between upstream and downstream measured flow rates which exceeds a predetermined limit value in removing a valve-opening signal to the upstream shut-off valve, thus closing the valve to interrupt flow of liquid through the valve if the differential flow-rate signifies a leak. Optionally, the apparatus also includes a downstream shut-off valve positioned between the destination terminal and a return line, which is also closed in response to a differential flow-rate exceeding the limit value.

17 Claims, 3 Drawing Sheets

WATER LEAK DETECTION AND SHUT-OFF METHOD AND APPARATUS USING DIFFERENTIAL FLOW RATE SENSORS

BACKGROUND OF THE INVENTION

A. Field of the Invention

The present invention relates to methods and apparatus for detecting and abating leaks of flowing liquids from pipes in buildings and similar structures. More particularly, the invention relates to a method and apparatus which uses differential flow rate sensors for detecting water leaks, particularly in closed loop water circulation systems, and solenoid valves to shut off water flow if a detected leak rate exceeds a predetermined value.

B. Description of Background Art

Contemporary buildings of various types, and particularly hospitals, institutional buildings, and larger commercial and industrial buildings employ a variety of water distribution piping or plumbing systems. Thus, in addition to plumbing used to supply potable water for consumption by the building' occupants, highly purified water for use in production processing, or lower quality water for other purposes, many larger contemporary buildings also have at least one of the following two additional types of water distribution systems through which water is circulated, but infrequently discharged. One such water circulation or distribution system, which may be referred to as a "closed-loop" or closed-cycle system is used to supply water to ceiling-mounted fire extinguisher sprinkler heads. Obviously, water conveyed through plumbing of a building water supply system to fire sprinkler heads is discharged from the system rarely, that is, only in the event of a fire, or during periodic testing of the fire sprinkler system and sprinkler heads.

A second type of closed-loop water circulation system used in many larger contemporary buildings comprises part of the Heating, Ventilating and Air Conditioning (HVAC) system of the building. In particular, some larger buildings including hospitals use hot water as a primary working fluid to heat various regions or zones of the building to different individually controllable temperatures. The hot water is generated by a boiler which is generally located in a basement of the building, or in another structure which houses the "mechanical plant" of the building adjacent to the building. The hot water is typically circulated in a continuously, closed loop cycle, which originates at the hot, discharge side of a boiler heat exchanger.

Heated water issued from the discharge side of a boiler heat-exchanger is pumped upwardly through a vertical hot water source (HWS) riser pipe to the highest building floor requiring heating. At each location or zone of a building which requires heating, the hot water is input to a box-like heat exchanger terminal, such as a Variable Air Volume (VAV) terminal. Within the VAV terminal, air from an external source which is moved by an external or internal blower or fan is directed to flow in contact with the exterior surfaces of a coiled length of tubing called a heater coil which has an inlet port fitting which is connected to and receives hot water from the hot water source riser pipe.

The heater coil functions as a flowing air to hot water heat exchanger, and heats the air which flows through the heater coil. The flowing air is heated to a temperature which is adjusted by a thermostatically controlled fan and/or a damper valve for varying the volume of temperature controlled air which is discharged from the VAV terminal and conducted through ducts to ceiling diffusers or other outlet ports in various rooms of a building. Cooled water from the discharge side of the heat exchanger coil is conducted back down through a hot water return (HWR) riser line to the cold inlet side of the boiler heat exchanger. Thus, in such a system, a fixed volume of water is continuously circulated through the system, and is not discharged.

As can be well imagined, heating systems of the type described above, when used in large buildings with many zones and associated heat exchanger terminals, typically include a substantially large number of individual pipes, tubes and fittings. Thus there is the possibility of a leak developing at many different locations in the closed-loop system, the probability of which is increased in the event of seismic disturbance of the building. Therefore, it is understandable that prudent building maintenance procedures would necessitate monitoring such closed-loop water circulation systems for leaks, and providing an alarm signal to building maintenance personnel in the event of a leak. Also, it would be desirable to provide a method and apparatus for automatically shutting off flow of water if a leak is detected.

Regarding first the problem of detecting a water leak, there are of course a large variety of water leak detectors which employ sensors that utilize a supply voltage and a pair of electrodes to detect electrically conductive water which has leaked onto and bridged the sensor electrodes. However, such electrolytic water leak sensors are effective only in detecting water leakage at discrete locations where the sensors are placed. Such point sensors would be for detecting leaks in most closed-loop water circulation systems, such as an HVAC hot water circulation system of the type described above. This is because a water leak detection system using point sensors for systems such as closed-loop water circulating systems which extend over a large area would require an unreasonably large number of individual sensors which were placed near every possible leakage point.

That the detection and abatement of water leaks in contemporary buildings is an important problem is evidenced by two recent cases in California, where leakage from broken building hot water circulation systems caused more than one million dollars worth of damage in each of the buildings. Part of the expenses associated with water leaks in buildings results from modern building codes and potential legal liability which require the complete removal and replacement of all drywall that has been subjected to water leaks for more than 72 hours, to prevent the growth of molds which can cause health problems.

More important than potential financial losses which can result from water leakage that is not timely detected and abated is the possibility of serious injury or even death which can result if a leak in a hot water circulation system of a hospital building should occur. For example, a hot water leak may allow sufficient water to accumulate, leak through ceilings and scald patients in their beds on lower floors.

The foregoing considerations of potential financial losses, bodily injuries and even deaths which may result from water leaks in modern buildings, and the unavailability of an adequate solution to the problem of promptly detecting leaks and shutting off water flow in closed-loop water circulation systems prompted the present invention.

OBJECTS OF THE INVENTION

An object of the present invention is to provide a method and apparatus for detecting leaks in systems which convey flowing liquids such as water.

Another object of the invention is to provide a method and apparatus for detecting leaks from conduits which carry a flowing liquid such as water which uses a pair of differential flow-rate sensors to detect differences between upstream and downstream flow rates resulting from leakage of liquids at a location between upstream and downstream locations of a conduit where the flow rate sensors are located.

Another object of the invention is to provide a method and apparatus for detecting leakage of liquid flowing through a piping system including an upstream source line and a downstream return line, the apparatus using a pair of flow-rate sensors for detecting differences between upstream and downstream flow rates which signify leakage of flowing liquid at a location between the upstream and downstream flow-rate sensors.

Another object of the invention is to provide a method and apparatus for detecting leakage of liquid from a closed-loop liquid circulation piping system for conducting water to and from a terminal, the apparatus including an upstream flow rate sensor and a downstream flow rate sensor to detect differences in upstream and downstream flow rates, control logic circuitry which outputs an alarm status signal if the difference in upstream and downstream flow rates exceeds a predetermined threshold value, an upstream valve in the upstream line operatively interconnected and responsive to the alarm status signal in shutting off upstream flow of liquid to the terminal, and an optional downstream shut-off valve responsive to the alarm status signal in shutting off downstream flow of liquid from the terminal.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends a method and apparatus for detecting leaks from a conduit such as a pipe carrying a flowing liquid, and for shutting off flow of the liquid if a detected leak rate exceeds a predetermined, preset value. More particularly, the method and apparatus of the present invention provide a means for detecting leakage of water flowing through a pipe, tube or other conduit, providing an alarm status signal if the detected leak rate exceeds a predetermined, preset value, and actuating an upstream shut-off valve and an optional downstream shut-off valve in response to the alarm status signal.

The novel leak detection and shut-off method and apparatus according to the present invention have a wide variety of useful applications. However, a primary intended application for the method and apparatus of the present invention is to minimize potential property damage and injuries to humans which could result from leakage of water from a hot water circulation system which comprises part of a Heating, Ventilating and Air Conditioning (HVAC) system of a building.

A water leak detection and shut-off apparatus according to the present invention includes a first, upstream flow rate sensor. The upstream flow rate sensor is used to measure the flow rate of a liquid such as hot water at a location between a source of flowing liquid, such as a hot water source (HWS) riser pipe, to an inlet port of a destination terminal for the flowing liquid, such as a Variable Air Volume (VAV) air-to-water heat exchanger box.

The leak detection and shut-off apparatus according to the present invention includes a second, downstream flow rate sensor. The downstream flow rate sensor is used to measure the flow rate of a liquid such as hot water at a location between an outlet port of a destination such as a VAV terminal and a return conduit for liquid from the terminal, such as a hot water return (HWR) riser pipe.

According to the present invention, the leak detection and shut-off apparatus also includes at least a first, upstream shut-off valve. The upstream shut-off valve is located between a source of flowing liquid, such as a HWS riser pipe, and a terminal such as a VAV box. In a preferred embodiment, the upstream shut-off valve is a solenoid actuated valve which has an inlet port connected to the HWS riser pipe and an outlet port connected to a section of pipe in which is located the first, upstream flow rate sensor.

The leak detection and shut-off apparatus according to the present invention includes a control module which contains electronic logic control circuitry that has a first set of input signal or interrupt lines which are electrically connected to signal output terminals of the upstream flow rate sensor. The control logic circuitry processes signals received from the upstream flow rate sensor, and uses scaling circuitry to produce a signal, preferably a digital signal which has a numeric value that has a magnitude which is proportional to the measured, flow rate of liquid through the upstream flow sensor. For example, if the range of normal flow rates through the upstream flow sensor were expected to be between 60 and 80 gallons per Minute (GPM), the upstream flow rate sensor and control circuitry, could be selected to have a full-scale output voltage of 5 volts D.C. for a flow rate of 100 GPM, 4 volts for 80 GPM, 3 volts for 60 GPM, etc.

The control module of the leak detection and shut-off apparatus according to the present invention includes a second set of input or interrupt lines which are electrically connected to the signal output terminals of the downstream flow rate sensor. Scaling circuitry within the control module outputs a voltage scaled to the flow rate measured by the downstream flow rate sensor, which has a similar and preferably the same sensitivity or scale factor as that of the upstream flow rate sensor, i.e., 5 volts for a measured downstream flow rate of 100 GPM, 4 volts for a 80 GPM flow rate, 3 volts for a 60 GPM flow rate, etc.

According to the invention, the control module also includes a subtractor which is preferably implemented as a software application that resides in a; microprocessor, microcontroller, or other such digital computational circuitry.

The subtractor of the control module outputs a signal which is proportional to the difference between upstream and downstream flow rates measured by the upstream and downstream flow rate sensors, respectively. The control module also has a memory location which contains a predetermined differential flow rate limit value, e.g., 0.1 GPM, which is input to the control module as a pre-programmed number, or input by an external data input.

If the predetermined differential flow rate limit value is exceeded, comparator circuitry within the control module which has an input connected to the subtractor outputs an alarm status signal, which typically would be a logic TRUE signal. For example, the control module could be programmed to provide an alarm status signal upon detecting a flow rate difference equal to or exceeding 0.1 GPM between upstream and downstream flow rate sensors. Since, in the absence of leakage at any place between upstream and downstream flow rate sensors, the flow rates measured by the two sensors would be substantially identical, save for small frictional losses, it can be inferred that any difference greater than a certain small threshold value between measured upstream and downstream flow rates signifies existence of a leak somewhere in the piping system between the two sensors.

When the difference between measured upstream and downstream flow rates exceeds a predetermined threshold limit value and thus causes the alarm status output line of the control module to go to a logic TRUE state, the alarm status signal actuates and energizes a solid state or electro-mechanical valve shut-off relay. In turn, the valve shut-off relay interrupts a 24-volt A.C. power supplied to the upstream solenoid shut-off valve.

The solenoid shut-off valve is a normally closed valve which opens to allow flow only when supplied with continuous electrical power. Therefore, if a leak rate which exceeds a predetermined limit value occurs, or if electrical power is interrupted to the building mains which supply power to the control apparatus, according to the present invention, the upstream shut-off valve immediately and automatically closes and interrupts the flow of hot water from the hot water source riser line to a destination which is downstream from the apparatus, such as a VAV terminal. Thus, in the event of a detected water leak or interruption of building power, the apparatus according to the present invention is effective in immediately terminating flow of hot water beyond the upstream shut-off valve. Optionally and desirably, the alarm status signal would also be sent to building maintenance stations to inform maintenance personnel of a detected leak.

A preferred embodiment of a leak detection method and apparatus according to the present invention also includes a normally closed, solenoid actuated downstream shut-off valve, which may be identical to the upstream shut-off valve. The downstream shut-off valve is located between the downstream flow rate sensor and the Hot Water Return (HWR) riser pipe. The downstream shut-off valve is operated in unison with the upstream shut-off valve, i.e., it is closed when a leak of a predetermined minimum value occurs, or if electrical power to the building is interrupted. The downstream shut-off valve is provided in addition to the upstream shut-off valve to prevent any water to the riser HWS or HWR lines from flowing back to the area where the leak has been detected.

DESCRIPTION OF THE PREFERRED EMBODIMENTS

Figure 1:
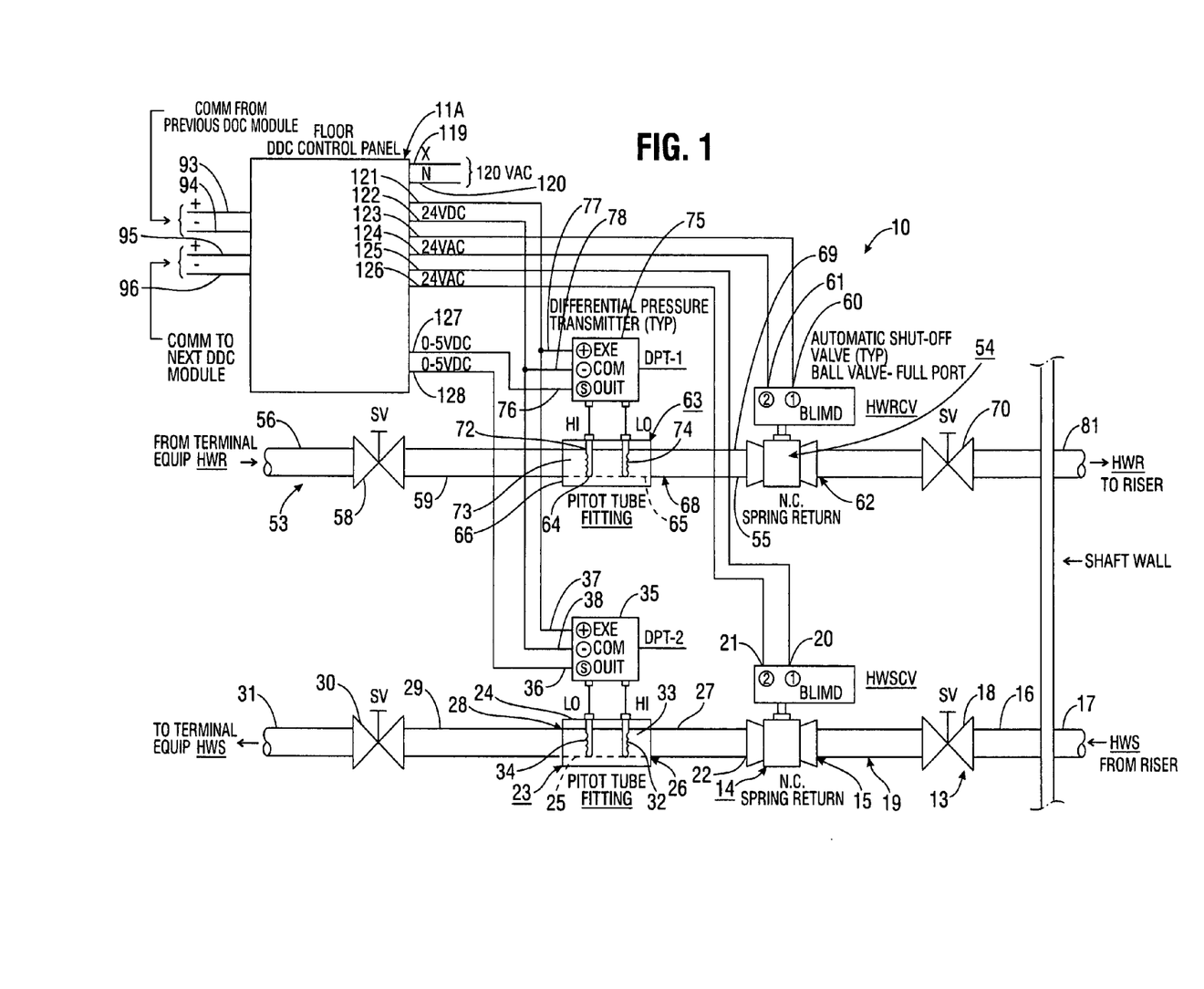
FIG. 1 is a schematic diagram of an apparatus for water leak detection and shut-off method according to the present invention, showing the apparatus installed in a closed-loop water circulation plumbing system.
Figure 2:
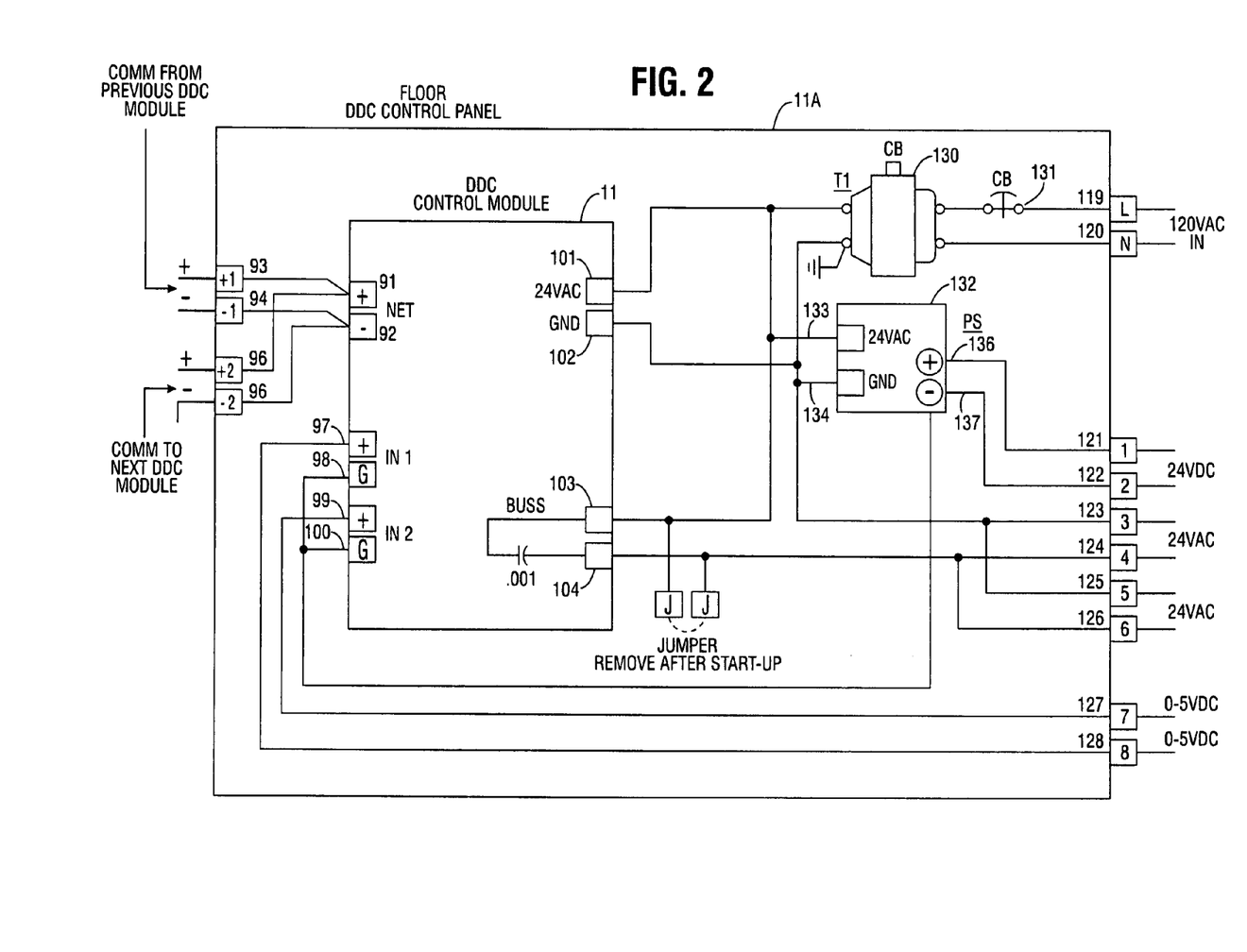
FIG. 2 is a more detailed schematic diagram of a control module comprising part of the apparatus of FIG. 1.
Figure 3:
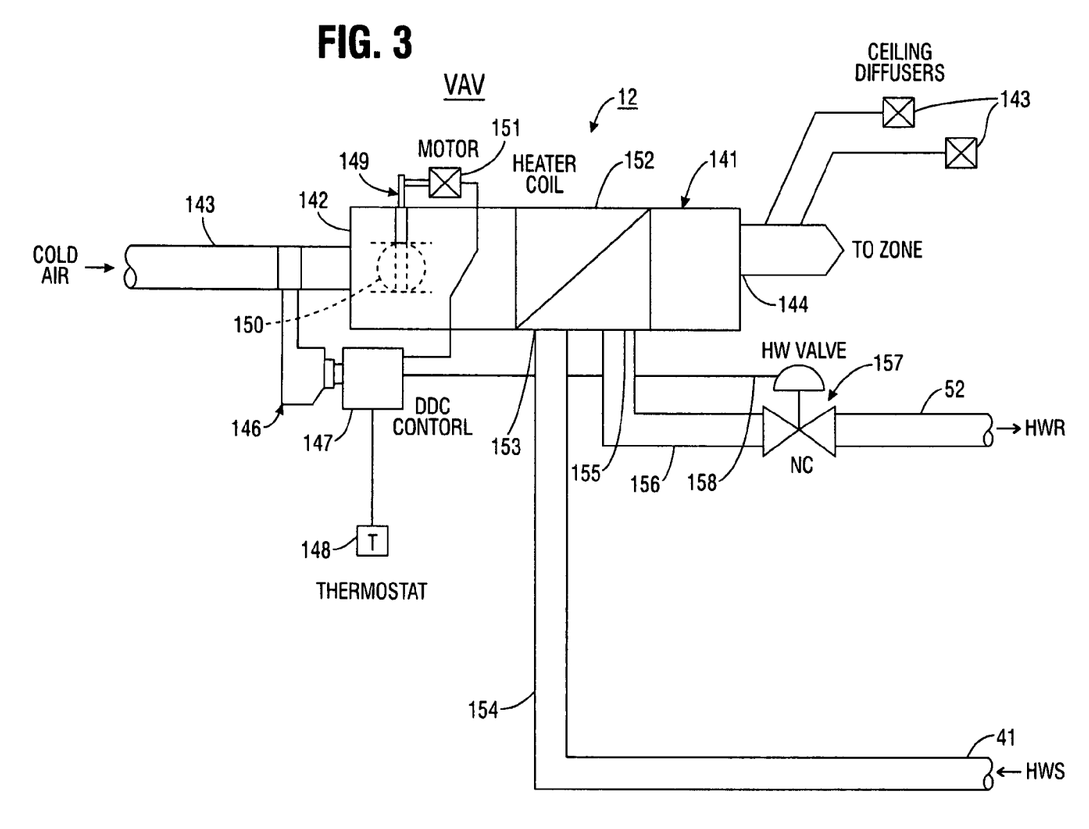
FIG. 3 is a partly diagrammatic view of a Variable Air Volume (VAV) terminal, one of a variety of different types of terminal equipment interconnectable to the leak detection and shut-off apparatus of FIG. 1.

FIG. 1 illustrates a basic embodiment of water leak detection and shut-off apparatus 10 using differential flow rate sensors according to the present invention. FIG. 2 is a more detailed schematic view of a control panel 11A and control module 11 comprising part of the apparatus 10 of FIG. 1. FIG. 3 is a partly diagrammatic view of a Variable Air Volume (VAV) terminal 12 which; typifies a terminal component of a closed-loop water circulation system of a type which apparatus 10 is intended for use with.

Referring now to FIG. 1, it may be seen that water leak detection and shut-off apparatus 10 according to the present invention includes an upstream inlet port 13 for receiving a flowing liquid such as hot water which is pressurized above ambient atmosphere pressure by a pump and/or a gravity pressure head, i.e., from a pump at any elevation or a tank at a higher elevation than inlet port 13. Upstream inlet port 13 is connected by a fluid pressure-tight tube or pipe to the inlet port 15 of a first, upstream solenoid valve 14.

As shown in FIG. 1, upstream inlet port 13 of apparatus 10 includes an inlet pipe 16 which is continuous with or connected through a fitting (not shown) to a source of pressurized liquid, such as an upper part of a Hot Water Source (HWS) riser pipe 17 which is connected at the lower end to a source of hot water, such as a boiler heat exchanger. As is also shown in FIG. 1, inlet port 13 of apparatus 10 may optionally include an upstream inlet manual shut-off valve 18 which has an inlet port connected to inlet pipe 16, and an outlet pipe 19 which is connected between an outlet port of manual shut-Off valve 18 and inlet port 15 of solenoid valve 14.

Solenoid valve 14 is preferably a normally closed (NC) valve in which an internal spring maintains a gate element, such as a ball or plate, of the valve in a fully closed position unless an electrical power such as 24-volt A.C. power is input to terminals 20, 21 of the valve, thus actuating a solenoid within the valve to open the gate against the closing force of the valve's internal spring. In an example embodiment of apparatus 10 which was designed, built and tested by the present inventors, upstream solenoid valve 14 was a B220+ NC/FC+LF24US model manufactured by Belimo Amiricas, 43 Old School Rd., Danbury, Conn. 06810. That valve had the following characteristics spring return normally closed full port ball valve. As shown in FIG. 1, valve 14 has an outlet port 22.

Referring still to FIG. 1, it may be seen that water leak detection and shut-off apparatus 10 according to the present invention includes a first, upstream flow rate sensor 23. Flow rate sensor 23 has a tubular body 24 which has disposed longitudinally therethrough a bore 25. Bore 25 of flow rate sensor 23 preferably has a cross-sectional area which is large enough to provide a negligibly small impedance or restriction to flow of liquid through apparatus 10.

As shown in FIG. 1, bore 25 of sensor 23 has an inlet port 26 which is connected in fluid pressure-tight connection through a pipe 27 to outlet port 22 of upstream solenoid valve 14. Bore 25 of sensor 23 also has an outlet port 28 which is connected in a fluid pressure-tight connection to an upstream outlet pipe 29 of apparatus 10. Optionally, apparatus 10 may include a manually operable upstream outlet shut-off valve 30 which has an inlet port connected in a fluid pressure-tight connection to pipe 29 and an outlet port connected to upstream outlet port 31. In an example embodiment of apparatus 10 which was designed, built and tested by the present inventors, upstream flow rate sensor 23 was a 600 model manufactured by Imperial Flange and Fitting Company, P.O. Box 352262, Los Angeles, Calif. 90035.

The flow rate sensor 23 is a Pitot tube-type flow meter which has an upstream "high side" Pitot tube probe 32 that protrudes radially inwards through the cylindrical wall 33 of the sensor body 24 into bore 25 of the sensor. The upstream Pitot tube probe 32 has a transversely disposed, upstream pointing face in which is located at least one orifice which has a longitudinally disposed bore for measuring the stagnation pressure of liquid impacting the upstream face of the probe.

Pitot tube flow rate sensor 23 also has a second, downstream Pitot tube probe 24 which protrudes radially inwards through wall 33 of sensor body 24 into bore 25 of the sensor 23. The downstream Pitot tube 34 has a transversely disposed, downstream pointing face in which is located at least one orifice for measuring the hydrostatic pressure of liquid in bore 25 of sensor body 24. Since the stagnation pressure at the entrance orifice(s) of upstream Pitot tube 34 is proportional to the kinetic energy of fluid impacting the upstream orifice plate face, and hydrostatic pressure at the entrance orifice(s) of downstream Pitot tube is proportional to static pressure of fluid in the sensor bore, the difference between the two pressure measurements is a measure of the velocity and hence mass flow rate of liquid through bore 25 of sensor 23.

Sensor 23 includes a transducer module for converting differences in measured pressures between upstream and downstream Pitot tube probes 32 and 34 into an electrical signal which is proportional to the velocity and hence mass flow rate of liquid through sensor 23. For example, a sensor 23 having a maximum useable flow rate of 100 gallons per minute (GPM) may have an output signal at output terminal 36 of transducer module 35 of five volts, full scale output level for a flow rate of 100 GPM, 4-volts for a flow rate of 80 GPM, 3-volts for a flow rate of 60 GPM, etc. Signal output terminal 36 of transducer module 35 is connected to interrupt input terminal 97 of control module 11.

As shown in FIG. 1, transducer module 35 has input power terminals 37, 38 for receiving DC power provided by control panel 11A, for powering electronics within the transducer module.

In a preferred embodiment of apparatus 10, at least the upstream Pitot tube probe 32 has a plurality of spaced apart orifices positioned on the rear, upstream face of the probe. This arrangement provides a measure of stagnation pressure which is averaged over the velocity profile of liquid flowing through bore 25 of sensor 23, and thus provides a more accurate measurement of the mass flow rate of liquid through the sensor.

Referring still to FIG. 1, it may be seen that the components 13 through 38 of apparatus 10 comprise what may be identified as an "upstream leg" 40 of the apparatus Upstream leg 40 of apparatus 10 has an inlet port consisting of an inlet pipe 16 which is connected to a source of pressurized water, which in the present example of an application for apparatus 10, is a Hot Water Source (HWS) riser pipe. As is also shown in FIG. 1, upstream leg 40 of apparatus 10 has an outlet port consisting of an outlet pipe 31. Outlet pipe 31 is connected to the inlet port of equipment which is supplied with a flowing liquid from apparatus 10, such as inlet port 41 of VAV terminal 12, as shown in FIG. 3.

Referring again to FIG. 1, it may be seen that leak detection and shut-off apparatus 10 includes a "downstream leg" 50 which is substantially similar to and may in fact be identical in construction and function to upstream leg 40. Thus, as will now be described, downstream leg 50 of apparatus 10 has components which are exact counterparts of those in upstream leg 40, which were previously described in detail above. The foregoing detailed description should be referred to in conjunction with the following abbreviated description of components of the downstream leg 50.

Referring to FIG. 1, it may be seen that downstream leg 50 of water leak detection and shut-off apparatus 10 includes a return inlet port 53 for receiving flowing water which has been returned from equipment supplied with hot water from outlet pipe 31 of upstream leg 40 of the apparatus. Downstream return inlet port 53 of apparatus 10 includes a return inlet pipe 56 which is connected to hot water return line of a destination for hot water from outlet pipe 31 of the apparatus, such as outlet pipe 52 of VAV terminal 12 (see FIG. 3).

As shown in FIG. 1, inlet port 53 of apparatus 10 may optionally include a manual inlet shut-off valve 58 which has an inlet port connected to a return inlet pipe 56, and an outlet pipe 59 which is connected between an outlet port of manual inlet pipe 59 and an inlet port 66 of a second, downstream flow-rate sensor 63.

In a preferred embodiment of apparatus 10, downstream flow-rate sensor 63 is identical in construction and function to upstream flow-rate sensor 23, which was described in detail above. Thus, downstream flow-rate sensor 63 has a tubular body 64 which has disposed longitudinally through its length a cylindrically shaped, circular cross-section bore 65. Inlet port 65 of downstream flow-rate sensor 63 is connected through pipe 59 to the outlet port of manual shut-off valve 58.

Referring still to FIG. 1, it may be seen that downstream flow-rate sensor 63 includes an upstream Pitot tube probe 72 and a downstream Pitot tube probe 74, both of which protrude radially inwardly through the cylindrical wall 73 of sensor body 64 into bore 65 of the sensor. Pitot tube probes 72, 74 are coupled to a pressure transducer transmitter module 75, which has a signal output terminal 76 that outputs a signal voltage proportional to the pressure difference between the probes, and hence the mass flow-rate of liquid through bore 65 of sensor 63. Pressure sensor transducer transmitter module 75 is provided with a 24-volt power from control module 11, which is input to line and ground terminals 77, 78 of the module. Signal output terminal 76 is connected to interrupt terminal 99 of control module 11.

Referring still to FIG. 1, it may be seen that downstream flow-rate sensor 63 has an outlet port 68 which is connected by an outlet pipe 69 to the inlet port 55 of a normally closed downstream solenoid valve 54. Downstream solenoid valve 54 may be identical in construction and function to upstream solenoid valve 14. Thus, as shown in FIG. 1, downstream solenoid valve 54 has electrical power input terminals 60, 61, which must be continuously provided with 24-volt AC power from control module 11 for valve 54 to remain open. Solenoid valve also has an outlet port 62 which is connected to a Hot Water Return (HWR) riser pipe 81. As shown in FIG. 1, apparatus 10 optionally includes a manually operable downstream outlet shut-off valve 70 connected between outlet port 62 of solenoid valve 54, and HWR riser pipe 81.

Referring now to FIG. 2, it may be seen that apparatus 10 includes a control panel 11A on which is mounted control module 11, along with other components which together comprise a Direct Digital Controller (DDC), of a type which is commonly used in HVAC systems to control parameters such as air temperature and air flow-rate in response to sensed parameters such as ambient temperature and humidity.

As shown in FIG. 2, the DDC controller module 11 is of conventional design and includes a microprocessor (not shown) and power supply. As shown in FIG. 2, DDC controller module 11 has a pair of bidirectional data signal terminals 91, 92 connected to network port terminals 93, 94 of a first, up-net network port 93A of DDC control panel 11A, and network port terminals 95, 96, of a second down-net port 95A of DDC control panel 11A. The network port terminals 93, 94 and 95, 96 of DDC control panel are used to enable interconnection of DDC control module 11 with previous and next DDC controller modules (not shown) which are part of a distributed network such as a Local Area Network (LAN).

Referring still to FIG. 2, it may be seen that DDC control module 11 has a first interrupt port consisting of a high-side interrupt terminal 97, and a low side or ground interrupt terminal 98. High-side input terminal 97 is connected to an input terminal 128 of DDC Control Panel 11A, which, as shown in FIG. 1, is connected to signal output terminal 36 of pressure transducer transmitter module 35 of upstream flow-rate sensor 23. Microprocessor circuitry within control module 11 converts an analog signal voltage present at the output signal terminal 36 of pressure transducer transmitter module 35, and hence at interrupt input terminal 97 of the DDC Control Module 11 to a digital value, and stores that digital value in a first memory location of the microprocessor for subsequent processing.

As shown in FIGS. 1 and 2, Control Module 11 also has a second interrupt input port consisting of a high-side interrupt terminal 99, and a low-side or ground interrupt terminal 100. High-side interrupt input terminal 99 is connected to an input terminal 127 of Control Panel 11A, which is in turn connected to signal output terminal 76 of pressure transducer transmitter module 75 of downstream flow-rate sensor 63. Microprocessor circuitry within control module 11 converts an analog signal voltage present at the output signal terminal 76 of pressure transducer transmitter 75, and hence at interrupt input terminal 99 of DDC control module 11 to a digital value, and stores that digital value in a second memory location of the microprocessor for subsequent processing.

Microprocessor circuitry within control module 11 also has stored within a third memory location of the microprocessor a digital number representing a maximum allowable difference between upstream and downstream flow-rates measured by upstream and downstream flow-rate sensors 23, 63, respectively. A typical threshold flow-rate difference value might, for example, be in the range of 0.1 to 1.0 gallons per minute (GPM). A selected threshold flow-rate difference value is entered into control module 11 by conventional means, such as via network ports 93A or 95A.

Microprocessor circuitry within control module 11 cyclically and continuously samples the values of upstream flow-rate and downstream flow-rates stored in the upstream and downstream flow-rate memory locations, and inputs those values into minuend and subtrahend ports of a digital subtractor application. The difference output value of the digital subtractor is input to the second variable input of digital comparator; application of the microprocessor. That application has a first, set point value input into which is input the threshold flow-rate. If the flow-rate difference input to the variable input port of the comparator equals or exceeds the threshold flow-rate, the comparator outputs a digital TRUE alarm status signal.

DDC Control Module 11 also contains an electromechanical or solid state relay (not shown) which receives a continuous energization signal from the microprocessor in the control module as long as the alarm status signal is not TRUE. The relay conducts 24-volt AC power input to terminal control module 11 on terminal 103 to output terminal 104 of the control module. Output terminal 104 of control module 11 is connected to switched 24-AC high-side terminals 124, 126 of control panel 11A which are in turn connected to high-side terminals 61, 21 of solenoid valves 54, 14 respectively. Low-side 24-AC terminals 123, 125 of control panel 11A are connected to low-side terminals 60, 20 of solenoid valves 54, 14. The switched 24-volt AC power supplied to solenoid valves 54, 14 maintains the valves in a fully open position. However, if the microprocessor in the control module 11 outputs a logic TRUE alarm status signal in response to measured flow-rate difference between upstream flow-rate sensor 23 and downstream flow-rate sensor 63 which exceeds the preprogrammed threshold value, 24-volt AC power supplied to the solenoid valves is immediately interrupted, thus causing the values to close and thus shut off flow of water from apparatus 10.

Referring to FIG. 2, it may be seen that control panel 11A includes a step-down transformer 130 which receives 115-volt AC power input to terminals 119, 120, of the control panel, and a circuit breaker 131 in series with input terminal 119 and the transformer. Transformer 130 supplies 24-volt AC power to terminals 101, 102 of DDC control module 11, as explained above, and to input terminals 134, 135 of a 24-volt DC power supply 132. Power supply 132 has plus and minus 24-volt DC output terminals 136, 137 which are connected to output terminals 121, 122, respectively, of DDC control panel 11A. As shown in FIG. 1, 24-volt DC power output on terminals 121, 122 of control panel 11A is input to transducer transmitter modules 35, 75 of flow-rate sensors 23, 63, respectively, on input terminal pairs 37, 38 and 77,78, respectively.

FIG. 3 illustrates a typical terminal 12 apparatus of the type which water leak detection and shutoff apparatus 10 is intended to be used with. As shown in FIG. 3, a Variable Air Volume (VAV) terminal 12 includes an elongated box-like heat exchanger duct 141 which has an inlet opening 142 that receives cold air from a cold air inlet duct 143. Heat exchanger duct 141 also has an air outlet opening 144 which is connected to a number of ceiling-mounted air flow diffusers 145.

As shown in FIG. 3, VAV terminal 12 includes an inlet air property sensor module 146 which contains a sensor for measuring properties of cold air inlet through duct 143, such as temperature, humidity and flow-rate, and inputs the values of the properties to a VAV controller 147, which may be part of DDC control panel 11A, or a separate controller.

As shown in FIG. 3, VAV terminal 12 includes a local or zone thermostat 148 by which a set point for a desired temperature range of a zone or zones services by terminal 12 may be manually or remotely input.

VAV terminal 12 also includes a damper valve 149 which has a damper plate 150 which is rotatable by a motor 151 to control the flow-rate of air input into entrance 142 of duct 141 from cold air inlet duct 143.

As shown in FIG. 3, VAV terminal 12 includes a heater coil 152. Heater coil 152 is a flowing air to water heat exchanger which includes an elongated coil of tubing which has high thermal conductivity, such as copper tubing, an inlet filling 153 for receiving in fluid pressure-tight connection a source of hot, flowing water, such as a pipe 154 connected to inlet port 41 of VAV terminal 12, and an outlet port 155 connected to a discharge or outlet pipe 156.

The heater coil 152 which typically has the shape of a spiral or helix which has a longitudinal axis coincident with the longitudinal axis of heat exchanger duct 152, provides an efficient means of transferring heat from the heated water input to inlet port 153 of the coil, to cold air flowing longitudinally through the heat exchanger duct and exiting through outlet opening 144 of the duct to ceiling diffusers 145.

As shown in FIG. 13, the temperature of air exiting heat exchanger duct 141 and conducted to ceiling diffusers 145 is controlled not only by controlling the air flow-rate via damper valve 149, but also by controlling the rate of hot water flow through heater coil 152. Thus, as shown in FIG. 3, VAV terminal 12 includes a Normally Closed (NC) proportional control valve 157 which has an inlet port connected to heat exchange coil outlet. discharge pipe 156, and an outlet port connected to VAV outlet pipe 52. Valve 157 has an actuator control terminal 158 which is connected to controller 147 and enables the flow-rate of hot water through valve 157 and water coil 152 to be varied over a continuous range from zero to maximum flow-rate.

What is claimed is:

1. A method for detecting leakage of fluid delivered from a source through a first, source conduit to a destination terminal and returned from the destination terminal through a second, return conduit, said method comprising;
    a. measuring a first flow rate of fluid through said source conduit at a first, upstream location to obtain a first, upstream flow rate value,
    b. measuring a second flow rate of fluid through said return conduit at a second location downstream from said first location, to obtain a second, downstream flow rate value,
    c. comparing said first and second flow rate values to obtain a difference value therebetween, said step of comparing said first and second flow rate values to obtain a difference value therebetween including the step of subtracting said second, downstream flow rate value from said first, upstream flow rate value to obtain a differential flow rate value,
    d. determining whether or not said differential flow rate value of said first and second flow rate values exceeds a predetermined limit value, and
    e. generating an alarm status signal if said differential flow rate value exceeds said predetermined limit value, said step of determining whether said differential flow rate value exceeds said predetermined limit value including the step of inputting said differential flow rate value to a first input node of a comparator, inputting said limit value to a second input node of said comparator, said comparator being configured to output said alarm status signal if said first input node value exceeds said second input node value.

2. The method of claim 1 further including the step of interrupting flow of said fluid through said return conduit in response to said alarm status signal.

3. The method of claim 1 wherein said comparator has a dead band equal to said predetermined limit value, and said comparator producing at an output node thereof said alarm status signal if the difference value between said first and second flow rate values exceeds said dead-band value of said comparator.

4. The method of claim 2 wherein said step of interrupting flow of fluid through said source conduit in response to said alarm status signal includes the step of shutting off flow of fluid at a location upstream of said first, upstream flow rate sensor.

5. The method of claim 4 further including the step of interrupting flow of fluid through said return conduit, said step including shutting off flow of fluid at a location downstream of said second, downstream flow rate sensor.

6. An apparatus for detecting leakage of liquid delivered from a source to a destination terminal through a first, source conduit and returned from the destination terminal through a second, return conduit, said apparatus comprising;
    a. a first, upstream flow rate sensor for measuring a first flow rate of liquid from a source of flowing liquid through said upstream flow rate sensor to a destination terminal,
    b. a second, downstream flow rate sensor for measuring a second flow rate of liquid from said destination terminal, and
    c. a comparator for determining a difference value between said first and second flow rate values and outputting an alarm status signal if said difference value exceeds a predetermined limit value, said comparator having a first signal input node connected to a signal output node of said first flow rate sensor, a second signal input node connected to a signal output node of said second flow rate sensor, and an output node on which said alarm status signal occurs if the difference between said first and second flow rate value signals exceeds said predetermine limit value.

7. The apparatus of claim 6 further including at least a first valve having an inlet port connected to said source and an outlet port connected to said first flow rate sensor, said first value being operatively interconnected to said comparator, said valve shutting off flow through said source conduit in response to said alarm status signal.

8. The apparatus of claim 7 wherein said first valve is further defined as being an electrically actuated solenoid value.

9. The apparatus of claim 8 wherein said first valve is further defined as being a normally closed valve, whereby interruption of electrical power to said valve causes a spring within said valve to close said valve.

10. The apparatus of claim 7 further including a second valve, said second valve having an inlet port connected to an outlet port of said second, downstream flow rate sensor.

11. The apparatus of claim 6 wherein said comparator is further defined as being a software application implemented in a digital computation apparatus.

12. The apparatus of claim 6 wherein said comparator is further defined as being an electronic circuit.

13. The apparatus of claim 6 wherein said first and second flow rate sensors are each further defined as being a Pitot-tube type sensor.

14. An apparatus for detecting a leakage of liquid from a terminal destination supplied with flowing liquid from a source through a source conduit and shutting off flow of liquid through said source conduit in response to a detection of a leak, said apparatus comprising;
    a. a first, upstream remotely actuatable shut-off valve having an inlet port connected to said source of flowing liquid,
    b. a first, upstream flow rate sensor having an inlet port connected to an outlet port of said first upstream valve, and an outlet port connected to an inlet port of a destination terminal,
    c. a second, downstream flow rate sensor having an inlet port connected to an outlet port of said destination terminal,
    d. an electronic control module having;
        i. a first interrupt input port electrically connected to an output terminal of said first upstream flow rate sensor for receiving a first upstream electrical flow-rate signal proportional to a first upstream flow-rate of liquid through said source conduit,
        ii. a second interrupt input port electrically connected to an output terminal of said second, downstream flow-rate sensor for receiving a second downstream electrical flow rate signal proportional to said second, downstream flow rate of liquid from said destination terminal,
        iii. first, upstream shut-off valve actuator circuitry electrically connected to input terminals of said first, upstream shut-off valve,
        iv. first, upstream valve shut-off circuitry for providing an input signal to said first, upstream shut-off valve actuator circuitry which causes said circuitry to output a valve-opening signal to said valve, and
        v. comparator circuitry for comparing said first and second flow-rate sensor signals, said comparator having a first signal input node connected to said first interrupt port, a second signal input node connected to said second interrupt port, and an output node for outputting a signal to said first shut-off valve circuitry to remove said valve-opening signal if a difference between said first and second flow-rate sensor signals indicates a difference between first and second flow-rates that exceeds a predetermined limit value.

15. The apparatus of claim 14 further including;
a. a second, downstream remotely actuatable shut-off valve, and
b. second, downstream shut-off valve control circuitry for providing an input signal to said second, downstream shut-off valve circuitry which causes said circuitry to output a valve-opening signal unless said comparator circuitry outputs a signal to said second valve control circuitry indicating a difference between first and second flow-rates which exceeds a predetermined limit value.

16. The apparatus of claim 15 wherein said first and second shut-off valves are normally closed, spring actuated solenoid valves.

17. The apparatus of claim 14 wherein said electronic control module includes micro-processor control logic.

* * * * *